United States Patent [19]

Spirin et al.

[11] 4,259,063
[45] Mar. 31, 1981

[54] APPARATUS FOR A HEAT TREATMENT OF PRODUCTS

[76] Inventors: Evgeny T. Spirin, ulitsa Usacheva, 29, korpus 3, kv. 203; Vladimir V. Shakhov, ulitsa Yablochkova, 31, kv. 73; Viktor V. Vagin, 9 Sokolnicheskaya ulitsa, 1, korpus 2, kv. 78; Kaletta M. Vainzof, ulitsa Poteshnaya, 2, kv. 34; Zimel A. Bogushev, Universitetsky prospekt, 6, kv. 125, all of Moscow, U.S.S.R.

[21] Appl. No.: 62,120

[22] Filed: Jul. 30, 1979

[51] Int. Cl.³ .................... F27B 9/14; F27D 3/00
[52] U.S. Cl. .................... 432/124; 198/833; 432/239
[58] Field of Search .......... 432/124, 137, 140, 239; 198/833

[56] References Cited
U.S. PATENT DOCUMENTS
3,917,445  11/1975  Suva et al. ................... 432/124

*Primary Examiner*—John J. Camby

[57] ABSTRACT

The apparatus comprises a treatment compartment having a heat radiation source and a conveying mechanism. The conveying mechanism comprises a load-bearing belt conveyor having a belt supporting products, and two pairs—upper and lower—of chain conveyors extending along the borders of the belt of the load-bearing conveyor and said chain conveyors being located within the treatment compartment. Each conveyor carries discs arranged to engage the borders of the belt on either side thereof, with the discs being displaced relative to one another.

The apparatus is preferably used for a treatment of food products, especially sausage products to impart better taste qualities to the product and to improve the external appearance.

2 Claims, 4 Drawing Figures

APPARATUS FOR A HEAT TREATMENT OF PRODUCTS

FIELD OF THE INVENTION

The invention relates to the heat treatment and, more particularly, to an apparatus for a heat treatment of cylindrically shaped food products.

The invention may be most advantageously used for a heat treatment of sausage products to impart better taste qualities thereto and to improve the external appearance.

The invention may also be used in the woodworking and construction industries for drying the surface of products.

STATE OF THE ART

Known in the art is an apparatus for a heat treatment of cylindrically shaped products. This apparatus is designed for the treatment of sausage products.

The prior art apparatus for a heat treatment of sausage products comprises a frame made of a set of parallel spaced wire elements. The wire elements define a pattern having a plurality of alternating regularly distributed ridges and recesses preventing products from touching one another.

This apparatus does not, however, permit the product to be transported concurrently with the heat treatment thereof so that a treating medium cannot uniformly act on the product, hence an adequate quality of the product cannot be ensured. Another disadvantage resides in the difficulties arising in effecting a sanitary treatment of the apparatus as the action of detergents is hampered by the plurality of alternating ridges and recesses in which fat particles accumulate.

A more related apparatus by its technical concept and result is an apparatus for a heat treatment of cylindrically shaped products which is also designed for a treatment of sausage products and comprises a treatment compartment having a heat radiation source and a conveying mechanism. The compartment accommodates vertically distributed horizontal slabs displaced relative to one another and having a corrugated surface, and the conveying mechanisms are arranged over the slabs and each comprises a rack driven along a closed path and having parallel straps secured thereto which function as pushers to push the products so as to ensure their treatment as they move forward within the compartment, by turning them over.

The disadvantages of this apparatus reside in that the straps are in contact with the product, which may result in deformation of the product and non-uniform rotation thereof as the straps turn the product over only at regular intervals, and sanitary treatment of the apparatus is difficult to achieve as the provision of the straps distributed in space and secured at a certain angle to the rack does not enable thorough and rapid washing of all surfaces of the apparatus; besides it is not possible to treat various cylindrically shaped products. In case it is required to treat a different kind of a cylindrically shaped product of greater or smaller diameter, substantial structural modifications of the conveying mechanism are required.

It is the main object of the invention to provide an apparatus for a heat treatment of cylindrically shaped products, and one which insures a high output.

Another object of the invention resides in the provision of an apparatus which ensures a uniform heat treatment of the entire product being treated.

Still another object of the invention is to provide an apparatus for the heat treatment of cylindrically shaped products, and which can be sanitarily treated without any difficulty.

A further object of the invention is to provide an apparatus enabling the treatment of products of different diameters.

The above and other objects are accomplished in an apparatus for a heat treatment of cylindrically shaped products, comprisisng: a compartment for treating products; a heat radiation source accommodated in said treatment compartment; a conveying mechanism arranged within said compartment; a load-bearing belt conveyor of said conveying mechanism; a support belt of said load-bearing belt conveyor, two pairs-upper and lower—of chain conveyors extending along the borders of said support belt; and discs arranged to engage the borders of said belt on either side thereof, said discs being displaced relative to one another.

This construction enables a uniform heat treatment of cylindrically shaped food products pasing through the treatment compartment since the belt acquires the form of a "Travelling wave" under the action of two pairs (upper and lower) of the chain conveyors. The formation of a "travelling wave" is effected by means of the discs of the chain conveyors extending on either side of the belt, the axes of the discs belonging to the lower conveyors being displaced relative to the axes of the discs belonging to the upper conveyors, thus contributing to the formation of moving ridges and recesses on the belt ("travelling wave") during the movement of the conveyors relative to the belt.

During the heat treatment of a product in the treatment compartment which is provided with infrared radiation sources a product which is supported in a recess of the support belt performs uniform rotary and progressive motions due to the movement of the load-bearing conveyor and the two pairs of the chain conveyors thus ensuring uniform treatment of the product surface.

Adjustment of speeds of both rotary and progressive motions of a product over a broad range provides the desired conditions for selecting an optimum performance of heat treatment of cylindrically shaped products of various kinds and diameters.

It is expedient to provide the chain conveyors of the lower pair with additional discs permanently engaged with the support belt from beneath and arranged in such a manner that the plane passing through the belt axis of symmetry also passes through the plane of contact of the additional discs with the belt. Such an arrangement prevents sagging of the belt supporting the product in the process of its being transferred through the treatment chamber.

DESCRIPTION OF THE PREFERRED EMBODIMENT

Other objects and advantages of the invention will become apparent from the following detailed description of a specific embodiment thereof with reference to the accompanying drawings, in which.

Figure 1:
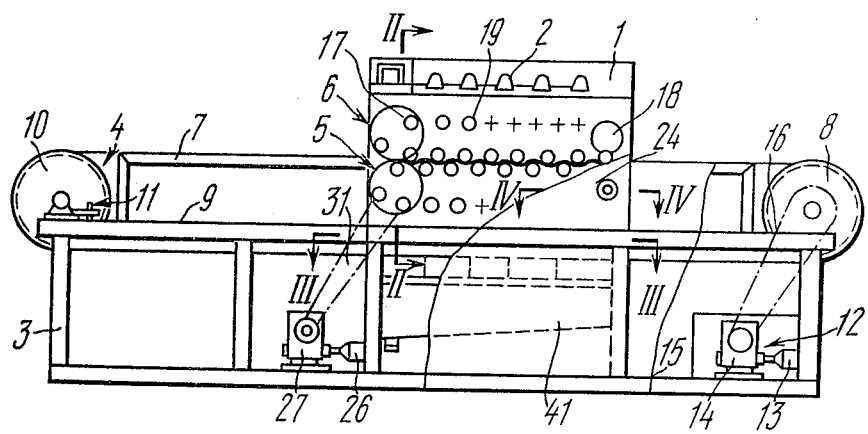
FIG. 1 is a general side elevational view of an apparatus for a heat treatment of sausage products.

An apparatus for a heat treatment of cylindrically shaped products, in particular for a heat treatment of sausage products, as shown in FIG. 1, comprises a treatment compartment 1 having heat radiation sources 2 and a conveying mechanism.

The heat radiation sources 2 are infrared radiation sources installed in the upper part of the treatment compartment 1.

The conveying mechanism is mounted on a frame 3 having two decks and comprises a load-bearing belt conveyor 4 and two pairs - lower and upper - of chain conveyors 5 and 6 extending along the borders of a support belt 7 of the load-bearing conveyor 4.

The load-bearing belt conveyor 4 comprises a drive roll 8 installed at one end of a base 9 of the upper deck of the frame 3, a driven roll 10 installed at the opposite end of the base 9 of the upper deck of the frame 3, the support belt 7 surrounding the rolls 8 and 10, a tensioning mechanism 11 in a force transmitting connection with the driven roll 10, and a drive 12.

The drive 12 comprises a hydraulic motor 13 having a reduction gear 14, which are installed on a base 15 of the lower deck of the frame 3, and a chain 16 coupling the reduction gear 14 to the drive roll 8.

Figure 2:
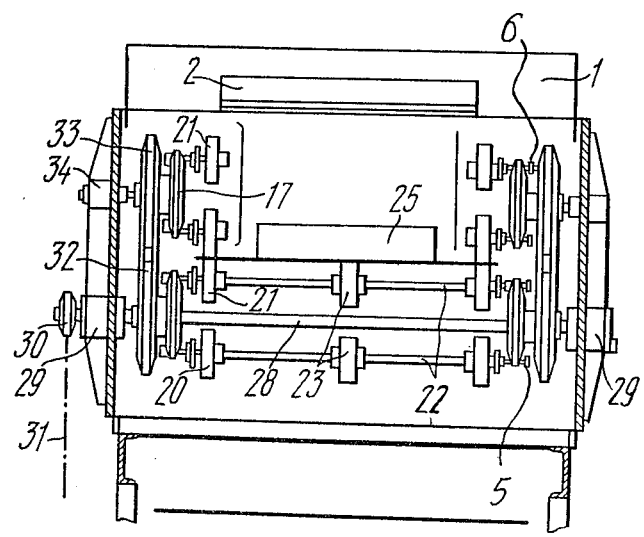
FIG. 2 is a partial sectional view taken along the line II—II of FIG. 1.

The lower chain conveyor 5 like the upper chain conveyor 6, comprises a drive sprocket 17 and a driven sprocket 18 arranged above and below the support belt 7, and are surrounded by the chains 19 of the conveyors 5 and 6 carrying discs 20 (FIG. 2) and 21 which are arranged to engage the borders of the support belt 7 on either side thereof and are spaced or displaced relative to one another, the discs 20 of the lower conveyors 5 being arranged symmetrically relative to the geometrical axes of the discs 21 of the upper conveyors 6. The discs 20 of the lower conveyors 5 are inter connected by axles 22 having additional discs 23 mounted for rotation in the middle thereof.

The discs 20 and 21 are loosely mounted on pivots (not shown) of the chains 19 of the conveyors 5 and 6, respectively, and are pivotable upon engagement with the support belt 7.

There are provided tensioning mechanisms 24 (FIG. 1) for tensioning the chains 19, which are in a force transmitting connection with the driven sprockets 18.

To eliminate sagging and to prolong the service life of the support belt 7, the discs 23 support a product 25 (FIG. 2) as it moves forward within the treatment compartment 1.

The chain conveyors 5 and 6 have a common drive comprising a hydraulic motor 26 (FIG. 1) and a reduction gear 27 installed on the base 15 of the lower deck of the frame 3, and a drive shaft 28 (FIG. 2) extending through the heat treatment compartment 1 and having its ends journalled in bearing assemblies 29. One end of the shaft 28 protrudes from the bearing assembly 29 and is provided with a sprocket 30 surrounded by a chain 31 coupling the sprocket 30 to the reduction 27.

Gears 32 secured to the ends of the shaft 28 mesh with gears 33 journalled in bearings 34 installed above the bearing assemblies 29 on the casing of the treatment compartment 1. The gears 32 and 33 are rigidly secured to the sprockets 17.

Figure 3:
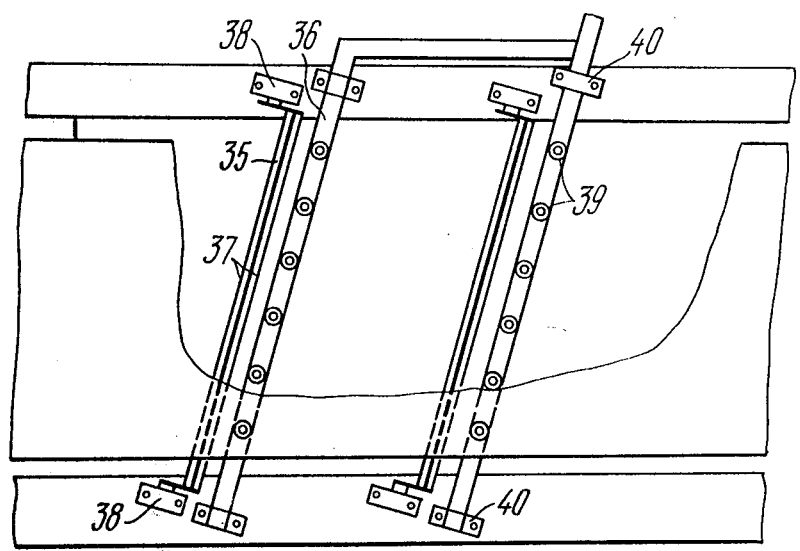
FIG. 3 is a partial sectional view taken along the line III—III of FIG. 1.

Rubber scrapers 35 (FIG. 3) and manifolds 36 for feeding a washing fluid under pressure are secured beneath the base 9 of the upper deck of the frame 3 at an angle to the support belt 7, with the manifolds 36 being arranged on the side of the rubber scrapers on which dirt particles accumulates.

The rubber scrapers 35 are secured in metal plates 37 which are attached by means of supports 38 to the base 9 of the upper deck of the frame 3. The manifolds 36 are provided with nozzles 39 and are secured to the base 9 by means of supports 40. For a better sanitary treatment of the support belt 7, the apparatus has two rubber scrapers 35 and two manifolds 36, the manifolds 36 being interconnected so that a washing fluid is fed from a common supply system.

A tank 41 as best shown in FIG. 1, which is slightly inclined, is arranged under the rubber scrapers 35 and manifolds 36 for collecting waste washing fluid.

Figure 4:
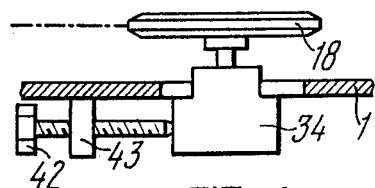
FIG. 4 is a partial sectional view taken along the line IV—IV of FIG. 1.

The tensioning mechanisms 11 and 24 (FIG. 1) used in the apparatus comprise a combination of a screw 42 and a nut 43 (FIG. 4). The nut 43 is secured to the base 9 of the upper deck of the frame 3 and to the casing of the compartment 1. Rotation of the screw 42 results in a displacement of the driven roll 10 and driven sprocket 18 for tensioning the support belt 7 and the chains 19, respectively.

OPERATION

The apparatus for a heat treatment of cylindrically shaped sausage products functions in the following manner. When the hydraulic motors 13 and 26 are started, the support belt 7 of the load-bearing conveyor 4 and the discs 20, 21, and 23 loosely mounted on the pivots of the chains 19 and on the axles 22 of the chain conveyors 5 and 6 start moving.

Torque is transmitted to the driven roll 10 of the load-bearing belt conveyor 4 from the hydraulic motor 13 via the reduction gear 14, chain 16 and drive roll 8 which rotates to cause the movement of the support belt 7.

Torque is transmitted to the upper 6 and lower 5 chain conveyors from the hydraulic motor 26, via the reduction gear 27, chain 31 and sprocket 30, to the drive shaft 28 on which are secured the gears 32 meshing with the gears 33.

Rotation of the gears 32 results in the rotation of the gears 33 and respective rotation of the sprockets 17 rigidly secured thereto, causing the chains 19 to move and to cause rotation of the driven sprockets 18.

The discs 20 of the lower conveyors 5 and the discs 21 of the upper conveyors 6 urge the support belt 7 alternately to the upper and lower position as they move, thereby forming a "travelling wave" along the belt.

The product 25 placed on the support belt 7 moves towards the heat treatment compartment 1 and, at the entrance to the compartment, it gets into a recess of the "travelling wave", and, as the speeds of movement of the support belt 7 and of the discs 20 of the lower conveyors 5 and of the discs 21 of the upper conveyors 6 are different, the product performs uniform rotary motion. The infrared radiation sources 2 arranged in the treatment compartment 1 effect the heat treatment of the product. The product subjected to the heat treatment leaves the treatment compartment 1 and is then removed from the support belt 7.

The support belt 7 is subjected to a sanitary treatment by the rubber scrapers 35 which clean its surface, and the manifolds 36 feed a washing fluid under pressure to wash off dirt particles accumulated on the rubber scrapers 35 and support belt 7. Waste washing fluid is drained into the tank 41 wherefrom it is removed to a sewage system.

By changing the rotary speed of the hydraulic motors 13 and 26 of both load-bearing conveyor and two pairs of the chain conveyors 5 and 6, desired progressive and rotary motions of the product are obtained, thereby providing for an optimum performance of heat treatment of cylindrically shaped sausage products differing in diameter and kind.

Although a preferred embodiment of the invention has been described hereinabove, numerous modifications and alternate constructions may be made in the apparatus shown in the drawings without deviating from the scope of the invention as defined in the claims.

The apparatus for heat treatment of cylindrically shaped food products is designed, in particular, for treating sausage products of various kinds and of different diameters, including formed sausage products.

The apparatus enables the manufacture of a product with better external appearance and taste qualities, which is ensured by uniform heat treatment and optimum production conditions. This is achieved owing to the fact that the product in the heat treatment compartment is subjected to uniform thermal action due to uniform rotary and progressive motions imparted to the product by the conveying mechanism.

The apparatus also makes it possible to impart and adjust over a broad range both rotary and progressive motions of the product thus providing required conditions for selecting desired heat treatment performance.

A sanitary treatment of this apparatus, namely of the working part thereof—support belt—is simple and convenient. It is effected in the lower part of the apparatus wherein the rubber scrapers and nozzles feeding a washing fluid to wash off fat particles are located. Waste washing fluid is drained into the tank and removed to a sewage system.

The invention may be used in the woodworking and construction industries for drying surfaces of products.

The apparatus according to the invention may be incorporated in flow production and automatic production lines where it is required to effect a heat treatment of cylindrically shaped food products.

What is claimed is:

1. An apparatus for a heat treatment of cylindrically shaped products, comrising: a compartment for heat treating said products; a heat radiation source and a conveying mechanism accommodated in said treatment compartment; a load-bearing belt conveyor of said conveying mechanism; a support belt of said load-bearing belt conveyor; upper and lower pairs of chain conveyors extending along the borders of said load-bearing belt; and discs cooperatively associated with said upper and lower pairs of chain conveyors and arranged to engage the borders of said support belt on either side thereof, with the discs of said lower chain conveyors being arranged symmetrically relative to the geometrical axes of the discs of the upper chain conveyors.

2. An apparatus for a heat treatment of cylindrically shaped products according to claim 1, including additional discs on the chain conveyors of the lower pair which are in permanent engagement with the support belt from beneath and are arranged in such a manner that a plane drawn through the axis of symmetry of said support belt extends through the plane of contact of said additional discs with said support belt.

* * * * *